GATE CIRCUITS UTILIZING LIGHT SOURCES AND PHOTOCONDUCTORS

Filed Dec. 29, 1960

INVENTOR
WILHELM SPRUTH
BY Elmer Galbiati
AGENT

United States Patent Office 3,145,301
Patented Aug. 18, 1964

3,145,301
GATE CIRCUITS UTILIZING LIGHT SOURCES AND PHOTOCONDUCTORS

Wilhelm Spruth, Peekskill, N.Y., assignor to International Business Machines Corporation, New York, N.Y., a corporation of New York Filed Dec. 29, 1960, Ser. No. 79,337
3 Claims. (Cl. 250—209)

This invention relates to switching circuits, and more particularly to the fabrication of switching circuits with light sources and photoconductors.

The use of light sources in combination with photoconductors to form switching circuits is well known in the art. For example, application No. 3,861, filed January 21, 1960, Photo-Responsive Logical Circuits, by Paul R. Lowe and Rex Rice, shows a plurality of switching circuits operated through the activation of photoconductors.

Such circuitry depends for its switching action upon the change in electrical resistance which certain photoconductive material exhibit when they are changed from a dark condition to an illuminated condition. Although this change in resistance is quite pronounced in certain well known materials, these materials do exhibit a certain amount of resistance when they are illuminated and they also allow a certain amount of conduction when they are dark. Hence, if photoconductors are used as taught by the prior art to operate a switching circuit, the switching effected will not be a total switching action (such as that effected by a set of relay contact points) and, if such a switch is used to control the application of a signal to a conductor, a small portion of the signal will be applied to the conductor even when the switch is in the "off" condition. Furthermore, due to the wide variation which exists in the characteristics of photoconductors which are produced by mass production methods, the photoconductor switches shown in the prior art can only be efficiently used in device which are designed to tolerate some variations in the degree of switching action achieved by the switch used.

An object of the present invention is to provide an improved photoconductor switch.

A further object of the present invention is to provide a photoconductor switch which can achieve any desired degree of switching action.

Another object of the present invention is to provide an AND circuit fabricated with photoconductors wherein the amount of signal allowed to pass through the switch when it is in the NOT AND condition is not merely dependent upon the dark resistance of the photoconductors used.

The improved switching action referred to is achieved in accordance with the present invention by use of a combination of complementarily illuminated series and shunt photoconductive paths.

The foregoing and other objects, features and advantages of the invention will be apparent from the following more particular description of several preferred embodiments of the invention, as illustrated in the accompanying drawings.

Figure 1:
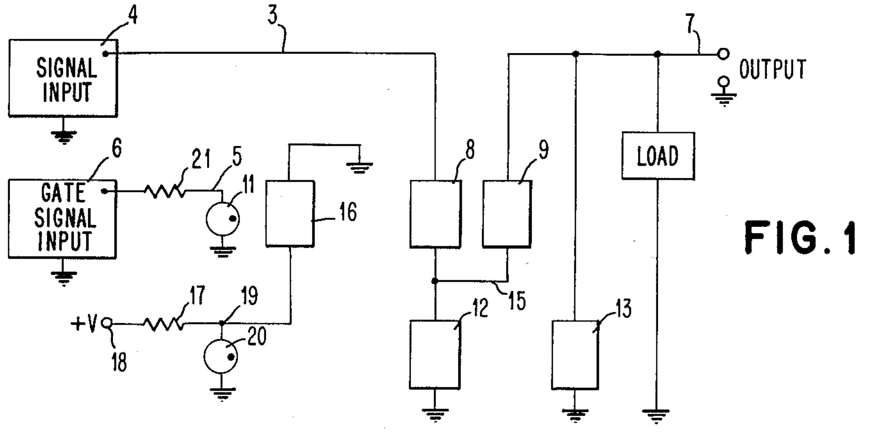
FIGURE 1 illustrates an embodiment of the invention in the form of a gate circuit.

For ease of understanding and illustration, the following conventions are used in the drawings: photoconductors are represented by rectangular boxes and light sources are represented by circles. All of the photoconductors which are shown at the same horizontal level as a light source are illuminated by the respective light source when it is active.

The first illustrative embodiment of the invention as shown in FIGURE 1 is a gate circuit which receives input signals on line 3 from a signal input means 4 and gating signals on line 5 from a gate signal input means 6 and which produces an output signal on line 7. The purpose of the device is to allow the signal on line 3 to pass through the device to line 7 when there is a signal on line 5. However, the signal on input line 3 is prevented from reaching the output line 7 when there is no signal on gate line 5.

The primary switching action is effected by the photoconductors 8 and 9, which are connected in series between the input and the output lines. Gate signals on line 5 activate the light source 11, illuminating photoconductors 8 and 9, thereby changing these photoconductors to their low resistance state and allowing signals to pass between input line 3 and output line 7. As will be explained in detail later, shunt paths are provided including photoconductors 12 and 13 which are illuminated whenever the photoconductors 8 and 9 are not illuminated, and they are not illuminated when photoconductors 8 and 9 are illuminated. Hence, when photoconductors 8 and 9 are in a high resistance state, photoconductors 12 and 13 are in a low resistance state and vice versa.

The resulting improved switching effect can best be understood by examining the action of photoconductors 8 and 12 which together form a voltage divider connected across the signal input terminals. When a gate signal is present, photoconductor 8 is illuminated and photoconductor 12 is dark (i.e., photoconductor 8 is in a low resistance state and photoconductor 12 is in a high resistance state). Hence, a major portion of the signal voltage appears on a line 15. However, when there is no gate signal on line 5 the photoconductor 8 is not illuminated and photoconductor 12 is illuminated (i.e., photoconductor 8 is in a high resistance state and photoconductor 12 is in a low resistance state). Hence, the major portion of the signal voltage appears across photoconductor 8 and does not appear on the line 15. An explanation of the manner in which photoconductors 12 and 13 are activated will be given later on in the description.

Photoconductors 9 and 13 comprise a second voltage divider which is connected in cascade with the first voltage divider. That is, the input to the second voltage divider is taken from the output of the first voltage divider (i.e., line 15) and the output of the second voltage divider goes to the output terminal lead 7 which may be coupled to a load as shown.

When photoconductor 8 is illuminated, photoconductor 9 is also illuminated (i.e., they are both in the low resistance state) and hence, the major portion of the signal voltage appears at the output terminal 7. However, when photoconductor 8 is not illuminated, photoconductor 9 likewise is not illuminated (i.e., they are both in the high resistance state) and photoconductors 12 and 13 are illuminated (i.e., they are in the low resistance state). Hence, that small portion of the signal voltage which appears on line 15 will be further decreased by the voltage divider which is formed by the high resistance of photoconductor 9 and the low resistance of photoconductor 13.

A plurality of similar voltage dividers could be cascaded to achieve any desired degree of switching action. Naturally, since variations exist in the parameters (i.e., the resistance when lighted and the resistance when dark) of the photoconductors as they are produced, a sufficient number of voltage dividers should be cascaded to accommodate for the range of variations in the photoconductors used.

The arrangement by which photoconductors 12 and 13 are illuminated whenever photoconductors 8 and 9 are not illuminated and vice versa, as mentioned above, will now be explained.

A photoconductor 16 is arranged in light receiving relationship to the source 11 and is in a high resistance state except when the light source 11 is illuminated. If photoconductor 16 is in a high resistance state the amount of current allowed to flow through a limiting resistor 17 from a source of voltage 18 is small and hence the voltage drop across the resistor 17 is small and there will be sufficient voltage at terminal 19 to activate a light source 20. However, when the light source 11 is activated, photoconductor 16 is changed to a low resistance state and an increased amount of current is drawn through the resistor 17 thereby decreasing the potential of the point 19 to the extent that light source 20 is deactivated.

Figure 2:
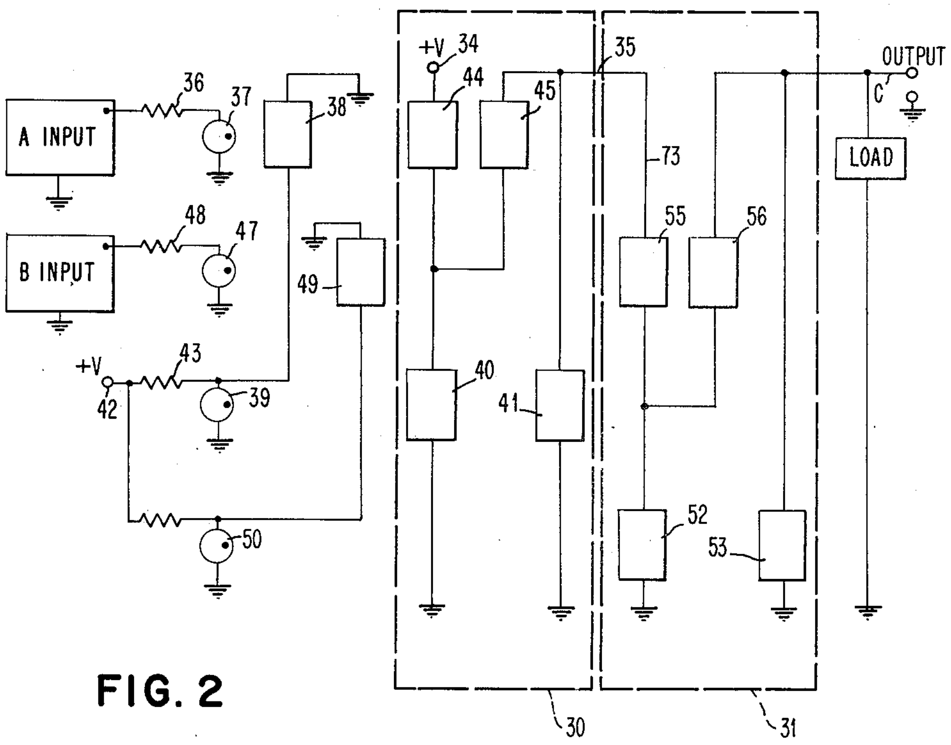
FIGURE 2 shows an AND circuit, which is another embodiment of the invention.

A further embodiment of the invention is shown in FIGURE 2 as an AND circuit. This circuit has two input signal means A and B and an output circuit C. If there is an input signal applied by both of the input signal means A and B there will be an output signal at C; however, if an input signal is applied by only one of the inputs A or B or to neither of the inputs A or B, no output signal appears at output C.

The circuit shown in FIGURE 2 is composed of two gating circuits 30 and 31 each of which is similar to the gating circuit shown in FIGURE 1. The first gating circuit 30 has a constant source of voltage supply 34 and its gate signal source is terminal A. The signal input to the circuit 31 is the output from the gating circuit 30 which appears in line 35 and the gate signal for the circuit 31 is the signal input means B.

If either gate 30 or 31 is in the "off" condition, no signal will appear at the output C. That is, if either of the inputs A or B is not activated, no signal will appear at C.

A signal from input A passes a resistor 36 and activates a light source 37 thereby illuminating photoconductor 38 and thereby de-activating a further light source 39, causing shunt paths including photoconductors 40 and 41 to assume a high resistance state. The source 39 is energized from a +V source 42 through a resistor 43. When source 37 is on, illuminating photoconductors 44 and 45, a low resistance path is formed between the voltage supply 34 and the input to the second gating circuit, line 35. Activation of the input B illuminates a light source 47, which is connected thereto by a resistor 48, thereby illuminating a photoconductor 49 and de-activating a further light source 50, causing photoconductors 52 and 53 to assume a high resistance state. Source 47 also illuminates photoconductors 55 and 56 thereby forming a low resistance path between line 35 and output C.

The circuit between voltage supply 34 and output C consists essentially of a series of voltage dividers. Each voltage divider can either supply the major portion of the applied signal to its output or it can dissipate the major portion of the applied signal before it reaches the output of the respective voltage divider. An output signal is developed at the output C only if all of the voltage dividers are in a condition which allows them to pass the major portion of the input signal applied to them.

As in the first embodiment, a sufficient series of voltage dividers can be cascaded in the AND circuit configuration to insure any desired degree of switching action irrespective of the non-uniformity in the parameters of the photoconductors that are available for use.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A gating circuit comprising in combination: signal input means,
 a plurality of voltage dividers connected in cascade across said signal input means,
 each of said voltage dividers comprising a first photoconductor device and a second photoconductor device connected in series,
 an electrical load connected between the first and second photoconductor devices in the last cascaded voltage divider,
 a first light source positioned to illuminate the first photoconductor device in each of said voltage dividers.
 a second light source normally activated and positioned to illuminate the second photoconductor device in each of said voltage dividers,
 gate signal input means for activating said first light source, and
 means for deactivating said second light source when said first light source is activated.

2. An AND circuit comprising:
 first and second signal input means,
 a voltage supply,
 a first plurality of voltage dividers connected across said voltage supply, each voltage dividers comprising first and second photoconductor devices connected in series;
 a second plurality of voltage dividers connected in cascade with said first plurality of voltage dividers, each of said second voltage dividers comprising first and second photoconductor devices connected in series;
 an electrical load connected between the first and second photoconductor devices in the last cascaded voltage divider of said second plurality of voltage dividers;
 a first light source positioned to illuminate said first photoconductor devices in said first plurality of voltage dividers;
 a second light source normally activated and positioned to illuminate said second photoconductive devices in said first plurality of voltage dividers;
 a third light source positioned to illuminate said first photoconductor devices in said second plurality of voltage dividers;
 a fourth light source normally activated and positioned to illuminate said second photoconductor devices in said second plurality of voltage dividers;
 means for activating said first light source in response to said first signal input means;
 means for deactivating said second light source when said first light source is activated;
 means for activating said third light source in response to said second signal input means; and
 means for deactivating said fourth light source when said third light source is activated.

3. An AND circuit comprising:
 first and second signal input means;
 a voltage supply;
 a first voltage divider connected across said voltage supply;

a second voltage divider connected in cascade with said first voltage divider;

each of said voltage dividers comprising first and second photoconductors connected in series;

an electrical load connected between the first and second photoconductor means in the second voltage divider;

a first light source positioned to illuminate said first photoconductor means in said first voltage divider;

a second light source positioned to illuminate said second plotoconductive means in said first voltage divider;

a third light source positioned to illuminate said first photoconductor means in said second voltage divider;

a fourth light source positioned to illuminate said second photoconductor means in said second voltage divider;

means for activating said first light source in response to said first signal input means;

means for activating said second light source complementarily to said first light source;

means for activating said third light source in response to said second signal input means; and means for activating said fourth light source complementarily to said third light source.

References Cited in the file of this patent

UNITED STATES PATENTS

| | | |
|---|---|---|
| 2,947,874 | Tomlinson | Aug. 2, 1960 |
| 2,997,596 | Vize | Aug. 22, 1961 |
| 3,050,633 | Loebner | Aug. 21, 1962 |
| 3,087,068 | Bowerman | Apr. 23, 1963 |